United States Patent [19]

Nishikawa

[11] Patent Number: 4,799,070

[45] Date of Patent: Jan. 17, 1989

[54] ION FLOW ELECTROSTATIC RECORDING PROCESS AND APPARATUS

[75] Inventor: Masaji Nishikawa, Hachioji, Japan

[73] Assignee: Olympus Optical Co., Ltd., Japan

[21] Appl. No.: 31,028

[22] Filed: Mar. 24, 1987

[30] Foreign Application Priority Data

Mar. 26, 1986 [JP] Japan .................................. 61-67940
Mar. 31, 1986 [JP] Japan .................................. 61-71028

[51] Int. Cl.⁴ ................................................ G01D 15/00

[52] U.S. Cl. .................................. 346/159; 346/153.1

[58] Field of Search .................. 346/159, 153.1, 160.1, 346/155; 355/3 CH, 3 TE, 14 CH; 400/119; 101/DIG. 13; 358/300

[56] References Cited

U.S. PATENT DOCUMENTS 4,425,035 1/1984 Tarumi et al. ...................... 346/154

*Primary Examiner*—Arthur G. Evans
*Attorney, Agent, or Firm*—Louis Weinstein

[57] ABSTRACT

An ion flow electrostatic recording process and apparatus utilizes an ion flow record head comprising an insulating layer, one surface of which is formed with a plurality of record electrodes, with ion flow openings formed so as to extend through the electrodes and the insulating layer. A source of corona ions is disposed on one side of the record head on which the record electrodes are disposed. An electrostatic record paper comprises a dielectric record layer on a conductive record layer, and is disposed in superimposed relationship with the insulating layer of the head. A record signal is applied across the conductive support layer and the record electrode to create an electric field within the opening which is effective to control the passage of a corona ion flow from the source through the opening, thus producing a record on the electrostatic record paper. A hermetically sealed chamber is defined by the ion flow head and a support frame therefor, and pressurized air is introduced into the chamber to prevent a plugging of the openings while the record paper is maintained in abutment against the head.

28 Claims, 13 Drawing Sheets

ION FLOW ELECTROSTATIC RECORDING PROCESS AND APPARATUS

BACKGROUND OF THE INVENTION

The invention relates to an ion flow electrostatic recording process and apparatus which utilizes an ion flow record head and electrostatic recording paper, and more particularly, to such process and apparatus in which a corona ion flow is controlled by a recording signal voltage to form an image of electrostatic charge on a dielectric record layer.

A recording process in which a record medium comprises a dielectric layer on the surface of a conductive member and an image of electrostatic charge is formed on the surface of the dielectric layer in a pattern corresponding to a record signal and then developed with toner to provide a visual image is referred to as an electrostatic recording process. Such electrostatic recording process is generally classified in one of two major categories; the use of a stylus electrode, commonly referred to as "multi-stylus" which is impressed against a dielectric layer while a high voltage record signal is applied thereto, to thereby form an electrostatic latent image on the surface of the dielectric layer, and the use of a record head comprising a source of corona ions and an element which controls a flow of corona ions produced individually for each picture element, the record head of the latter type being slightly spaced from the dielectric layer to thereby form an image of electrostatic charge on the surface of the dielectric layer in a non-contact manner.

In the former process, the record head used is simple in construction, and a drive circuit is also simple. However, it suffers from unfavorable phenomena that a record may be missed or that an abnormal record may be formed as a result of an abnormal discharge. By contrast, in the latter process which is referred to as an ion flow electrostatic recording process, the reproducibility of record dots and the uniformity of charge distribution within a dot are improved, and this process does not require any delicate contact between the dielectric layer and the record head. However, the record head used is complex in construction, and the process requires several high voltage supplies and also requires that a gap of a constant magnitude be maintained between the record head and the dielectric layer with a high accuracy.

By way of example, FIG. 19 schematically illustrates the latter process disclosed in U.S. Pat. No. 3,689,935. Specifically, an insulating sheet 101 is integrally provided with record signal electrodes 102, 103 on its opposite surfaces, and an ion flow opening 106 extends through the sheet and the electrodes. A source of charged particles 104 such as toner or corona ions is disposed on one side of the opening 106 while a rear electrode 108 is disposed on the other side of the opening, with a record paper 107 having a dielectric record layer being passed between the rear electrode 108 and the record signal electrode 103. It will be seen that lead wires 105*a*, 105*b* connect the electrodes 102, 103 with a source of record signal while an ion flow passing through the opening 106 is shown at 109.

In operation, an ion flow from the source 104, which may comprise a Corotron, moves through the opening 106 toward the paper 107. An electric field created by the pair of electrodes 102, 103 may be in the direction to accelerate the passage of ion flow through the opening

106, thus allowing the ions to pass therethrough to produce an electrostatic record on the paper 107. However, when such electric field is in a direction to block the passage of the ion flow, no record is made, Numerous arrangements are known for providing such an ion flow electrostatic recording. However, all of them share a corona ion generator, a multi-layer record head including electrodes to which a record signal is applied and a dielectric layer which is integral with the electrodes and through which an opening or slit is formed for allowing a selective passage of ions generated, a record medium disposed at a given spacing from the record head, and means for applying a bias voltage between the record medium and the record head.

Preferably, a gap between the record head and the record medium is on the order of 0.2 to 0.5 mm, for example, while a bias voltage on the order of 500 to 1,000 V is applied across the record head and the record medium. If the gap is unstable, a recording response will change, thus causing a variation in the size and the density of dots recorded. If the gap is reduced, the dielectric strength may be insufficient, causing sparks and resulting damage to the record head. If thread-like dust is deposited on the record head, it will extend toward the record medium under the influence of an electric field created, and inject an electric charge onto the record medium from its extremity, causing a black streak to be recorded. Furthermore, as the potential of dots in the resulting latent image rises, the dots recorded may easily increase in diameter.

Where the record medium comprises a drum coated with a dielectric material for repeated use and an electrostatic latent image formed on the drum is developed with a toner and a resulting toner being transferred, the gap between the drum and the record head may be maintained accurately to prevent the occurrence of described difficulties. However, if the record medium comprises a flexible one such as electrostatic recording paper comprising a dielectric record layer applied to a sheet-like conductive base or a base which is treated to be conductive so that the resulting record medium is disposable, it is very difficult to maintain a uniform gap between the record head and the record paper during the running of the latter.

Accordingly, in an electrostatic recording apparatus which utilizes electrostatic recording paper, use is made of a multi-stylus record head. On the other hand, in an electrostatic recording apparatus which utilizes an ion flow electrostatic record head, use is made of a record medium comprising a dielectric record layer formed on a metal drum for repeated use. It would be desirable to provide an electrostatic recording process which enables the use of a combination of an electrostatic record paper and an ion flow electrostatic record head which exhibits excellent recording characteristics. However, such process has not been implemented in the prior art, and its implementation involves a number of difficulties.

In the prior art construction of ion flow recording means, it is necessary to apply a high bias voltage across the electrode 103 and the rear electrode 108 or the dielectric record medium 107 in order to allow the ion flow to image upon the record medium without dispersion in moving from opening 106 to medium 107, and the distance therebetween must be maintained accurately. Deposition of foreign matter around the ion flow opening 106 prevents a normal recording, thus presenting a number of problems, which stand in the way of the implementation of such apparatus.

It is contemplated that such problems of the prior art could be overcome by providing ion flow recording means which performs a recording operation with the ion flow opening and the dielectric record medium disposed in superimposed relationship. This would eliminate an element of instability associated with the maintenance of a constant gap and the need to apply a high voltage which has been used to avoid a dispersion of the ion flow. However, while a mechanism which is used to maintain a constant gap accurately can be dispensed with, such recording means suffers from a disadvantage that a record paper may introduce foreign matter such as dust to plug the ion flow opening or that a running of the record paper may cause an abrasion of the ion flow head.

Another approach to maintain a flexible member in superimposed relationship with a member having an opening in an accurate and positive manner would be to provide a suction box which is partly defined by such member and which is maintained at negative pressure so that a sheet member may be held attracted to the opening. However, such approach results in an inconvenience, when applied to the ion flow recording apparatus, that the ion flow opening will be plugged with foreign matter in a very short time interval and the ion flow head will be abraded by the record paper.

SUMMARY OF THE INVENTION

It is a primary object of the invention to provide an ion flow electrostatic recording process and apparatus of a novel arrangement which overcomes the described problems of the prior art, by performing a recording operation with an ion flow head having an ion flow opening therein and a dielectric record medium disposed in superimposed relationship.

It is another object of the invention to provide an ion flow electrostatic recording process and apparatus which prevents a plugging of the ion flow opening and an abrasion of the ion flow head when the ion flow head is disposed in superimposed relationship with a dielectric record medium and which facilitates a relative positioning between the head and the record medium.

Thus according to the invention, a plurality of split electrodes, to which a record signal is applied, is formed on one surface of an insulating layer, and an ion flow opening which extends through the electrodes and the insulating layer is formed so that the electrodes are disposed along the periphery of the opening, thus constituting together an ion flow record head. A corona ion generator is disposed on the side of the record head on which the electrodes are disposed while an electrostatic record paper comprising a dielectric record layer and a conductive support layer is disposed in superimposed relationship with the other side of the insulating layer. Record signal voltage is applied across the conductive support layer and the electrodes to create an electric field within the ion flow opening, thus controlling a corona ion flow from the source through the opening. The ion flow which passes through the opening is guided toward the surface of the dielectric record layer under the influence of the electric field, thus forming an electrostatic record.

With the ion flow electrostatic recording process and apparatus according to the invention, if an electrode or a high voltage source is not provided to produce an electric field which has been required in the prior art to prevent a dispersion of an ion flow passing through the ion flow opening, a dispersion of the ion flow after its passage through the opening to cause an increase in the size of dots recorded can be prevented, thus achieving a highly fine recording. In addition, means which has been required in the prior art to maintain an accurate gap between the record head and the record medium in order to prevent a spreading of diameters of non-uniform dots recorded can be dispensed with, thus allowing a flexible record medium to be used as an electrostatic record paper. In addition, as the potential of a latent image formed on the record medium rises, the electric field created within the ion flow opening changes to complete the record at a given potential of the latent image automatically, thus enabling the implementation of an ion flow recording process which provides advantages including the formation of a record having an improved stability.

In an ion flow recording apparatus including an ion flow head comprising record signal electrodes integrally held on the surface of an insulating sheet through which an ion flow opening extends, a source of corona ions disposed on one side of the head, and a sheet-like record medium including a dielectric record layer and disposed on the other side of the head, with a signal voltage applied to the electrodes to control an electric field created within the ion flow opening to thereby control the passage of corona ions through the opening, in accordance with the invention, a hermetically sealed chamber is formed by a combination of the ion flow head and a support frame therefor, and means is provided for urging a record paper against the ion flow head. The record paper runs while it is maintained in abutment against the ion flow head, and pressurized air is introduced into the hermetically sealed chamber, and an air stream which flows out of the ion flow opening is caused to pass along a boundary surface between the ion flow head and the record paper. With this construction, both the record head and a bias source can be simplified, and positioning of the record medium is facilitated, thus enabling the application of such apparatus to a sheet-like record medium. An increase in the diameter of dots recorded can be prevented, and the tendency to form non-uniform dots recorded is reduced, and the density of the image can be automatically stabilized.

The forced air stream prevents the ion flow opening from being plugged with dust which may be carried by the record paper, and this air stream also functions as a lubricant to reduce a sliding resistance of the record paper relative to the ion flow head, thereby preventing an abrasion of the ion flow head by the record paper. In addition, a positioning of the record paper relative to the ion flow head is facilitated in a stable manner. In this manner, all of the difficulties which have been standing in the way to a practical implementation of an ion flow recording apparatus which performs a recording operation with a record paper superimposed with an ion flow head are removed.

DETAILED DESCRIPTION OF PREFERRED EMBODIMENTS

Figure 1A:
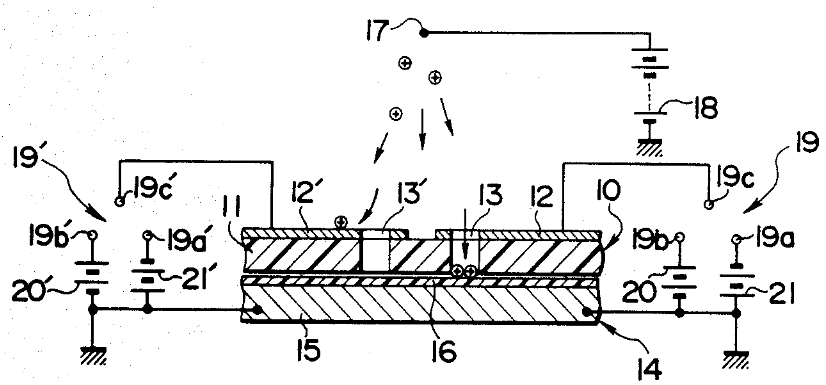
FIG. 1A is a schematic diagram illustrating a basic arrangement of an ion flow electrostatic recording process according to the invention.
Figure 1B:
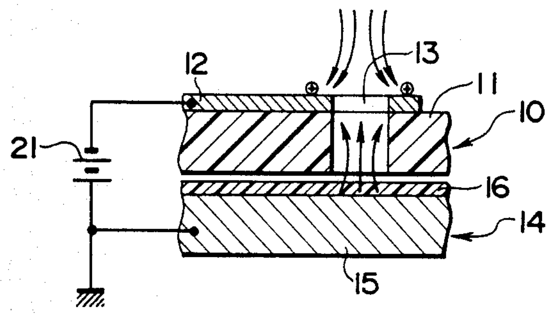
FIGS. 1B and 1C are similar schematic diagrams to that shown in FIG. 1A, and also illustrating an electric field which controls an ion flow.
Figure 1C:
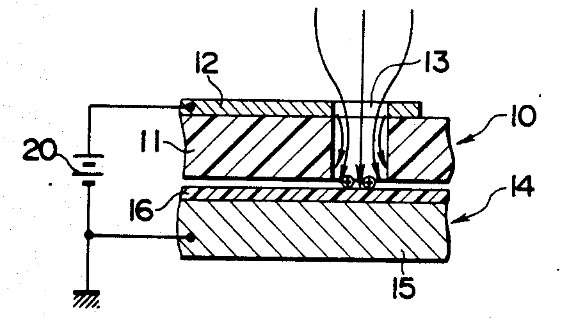

The invention will now be described with respect to specific embodiments thereof shown in the drawings. FIGS. 1A to 1C illustrate a basic concept of the invention. Referring to FIG. 1A, an ion flow electrostatic record head 10 comprises an insulating layer 11, electrodes 12, 12' formed on one surface of the insulating layer 11, and openings 13, 13' which extend through the insulating layer 11 and the electrodes 12, 12'. The electrodes 12, 12' are disposed so as to be terminated around the openings 13, 13'. An electrostatic record paper 14 comprises a support sheet 15, which is treated to be conductive, and on which a dielectric record layer 16 is formed as a thin coating. A source of corona ions 17 is illustrated by a simple wire of a Corotron. A high voltage source 18 is connected to the source 17 for producing a corona. Power supplies 20, 20', 21 and 21' are used as a source of record signal, and are selectively used through switches 19, 19', each having a common terminal **19*c* or 19*c'*. A switch terminal 19*a* or 19*a'* is connected to a power supply which provides a voltage for blocking an ion flow while a terminal 19*b* or 19*b'***, is connected to a power supply which provides a voltage for accelerating an ion flow.

Under the condition shown, the opening 13' assumes an ion flow blocking condition as a result of the application of an off record signal while the opening 13 assumes an ion flow accelerating condition as a result of the application of an on record signal. It should be understood that the power supplies 20, 20', 21 and 21' and changeover switches 19, 19' are schematically shown to illustrate the application of record signals to the electrodes 12, 12', but are actually formed by semiconductor switching elements. A corona wire 17 extends over an increased length in the direction perpendicular to the plane of the drawing, and a multitude of electrodes 12, 12' and openings 13, 13' are spaced apart along the length of the wire 17, thus forming a multi-element record head.

A recording operation takes place fundamentally by disposing the record head 10 in superimposed relationship with the electrostatic record paper 14. Each of the electrodes 12, 12' cooperates with the conductive support sheet 15 of the record paper 14 to create an electric field which controls the passage of an ion flow through the opening 13 or 13'.

FIGS. 1B and 1C illustrate the creation of an electric field which controls an ion flow. Corresponding parts to those illustrated in FIG. 1A are designated by like numerals. It will be understood that the record head 10 is disposed in contact with or very close to the electrostatic record paper 14, and a gap therebetween is preferably less than the depth of the opening 13 formed in the record head 10. FIG. 1B illustrates a condition which is established in response to an off signal. In this instance, an off signal voltage is applied across the electrode 12 and the conductive sheet 15, with the off signal being schematically indicated by the power source 21.

Under the condition shown, the conductive sheet 15 of the record paper is connected to the ground or to a reference potential having a polarity which attracts corona ions while a relatively negative voltage is applied to the electrode 12. As a result of the application of such voltage from the source 21, an electric field is established within the opening 13 in a direction to block a flow of positive corona ions, as indicated by arrows. It will be noted that an external field which is developed between a source of corona ions 17 such as a Corotron (see FIG. 1A) and the conductive sheet 15 is also effective in the opening 13, tending to induce the corona ion flow to move into the opening 13. Consequently, the total electric field within the opening 13 represents a sum of both electric fields, and the magnitude of the voltage of the source 21 or the off record signal is chosen so that such sum is effective to block the movement of the ion flow into the opening. When the electric field is created in this manner, an ion flow which is projected from the source 17 toward the opening 13 will be attracted by the negative voltage applied to the electrode 12 and becomes curved in its travelling path toward the opening 13, whereby it is absorbed by the electrode 12.

When a positive signal voltage is applied to the electrode 12 from the associated source 20 as indicated in FIG. 1C, an electric field is created between the electrode 12 and the conductive sheet 15 which allows and accelerates the movement of a flow of positive corona ions into the opening. Thus, the positive ion flow is allowed to move into the opening 13 to be deposited on and charge the surface of the dielectric record layer 16 of the electrostatic record paper 14. While part of the electric field developed by the electrode 12 passes through the interior of the insulating layer 11, the ion flow cannot move through the insulating layer 11, so that such part of the electric field is effective to narrow slightly a region through which the ion flow passes, by charging the internal wall of the opening 13 to a degree.

Consequently, the size of an electrostatic latent image which is formed on the dielectric record layer 16 is basically defined to be less than the diameter of the opening 13. In addition, when the latent image is formed on the record layer 16, the charge thereof rapidly diminishes the electric field which is effective to draw the ions into the opening 13, so that the resulting latent image cannot assume a potential higher than that which is determined by the signal voltage from the source 20, which is significantly favored to stabilize the recording process.

When the spacing between the record head 10 and the record paper 14 increases, the effect which limits the dot diameter of the electrostatic latent image is increasingly lost while simultaneously requiring a greater magnitude of the signal voltage for controlling the ion flow. For this reason, the ion flow record head 10 is disposed in superimposed relationship with a record medium such as the electrostatic record paper 14 during use in accordance with the invention. In this manner, the invention allows an electrostatic latent image to be formed which is less in diameter than the opening formed in the ion flow record head, thus facilitating the formation of openings and advantageously preventing a plugging of the openings.

It is also to be noted that an ion flow which has passed through the opening is caused to be deposited on the dielectric record layer 16 before it becomes dispersed in accordance with the invention. This eliminates the need of a bias voltage which has been required in the prior art to be applied across an ion flow record head and a conductive layer of a record medium in order to prevent a dispersion of a corona ion flow. In this manner, the power supply is simplified and the dielectric strength of a record signal circuit may be reduced while simultaneously preventing the occurrence of sparks caused by such bias voltage.

In addition, a recording operation takes place by a relative movement between the record head 10 and the electrostatic recording paper 14 while maintaining them in superimposed relationship. Accordingly, a mechanism which requires a high precision which forms and maintains an accurate gap dimension between the head and the medium can be dispensed with, and the invention is applicable to a record medium which is incapable of maintaining an exact configuration by itself. Alternatively, the invention can advantageously be applied in achieving an ion flow recording apparatus having an increased record width.

Where a record signal which continuously varies in electric potential between an off and an on level is applied to the electrode, a resulting latent image which is formed on the dielectric record layer will have an electric potential which continuously varies in a corresponding manner thus achieving an analog record. An analog record may also be achieved by employing a pulse voltage for the record signal which has a sufficiently high level to form a latent image having a high potential and the pulse width or the pulse repetition frequency of which is varied from picture element to picture element.

It should be understood that while the above description utilizes a positive corona ion flow, it will be understood that a negative corona ion flow may be similarly employed with a corresponding reversal of several power supplies and the polarity of the electric charge.

A basic construction of a record head which is used to carry out an ion flow electrostatic recording process of the invention as described in connection with FIGS. 1A to 1C is a multi-element head. It will be noted that such a multi-element record head is usually driven by a matrix arrangement in order to simplify the drive circuit. A matrix drive is also possible with the record head which is used to carry out the record process of the invention, but this requires a specific record head. Thus, an ion flow electrostatic recording process according to the invention comprises the steps of a plurality of split electrodes on one surface of an insulating layer, forming ion flow openings which extend through the insulating layer and the electrodes so that the electrodes are disposed around the peripheral edge of the openings, disposing a block electrode on the other surface of the insulating layer so as to be slightly spaced from the ion flow openings, the combination of the split electrode and the block electrode forming together an ion flow record head, disposing a source of corona ions on the side of the record head on which the split electrodes are disposed, disposing an electrostatic record paper comprising a dielectric record layer on a conductive support layer in superimposed relationship with the record head with the dielectric layer facing the block electrode, applying a record signal voltage across the split electrode and the block electrode to create an electric field within the ion flow opening, thereby controlling the passage of a corona ion flow through the ion flow opening.

Figure 2A:
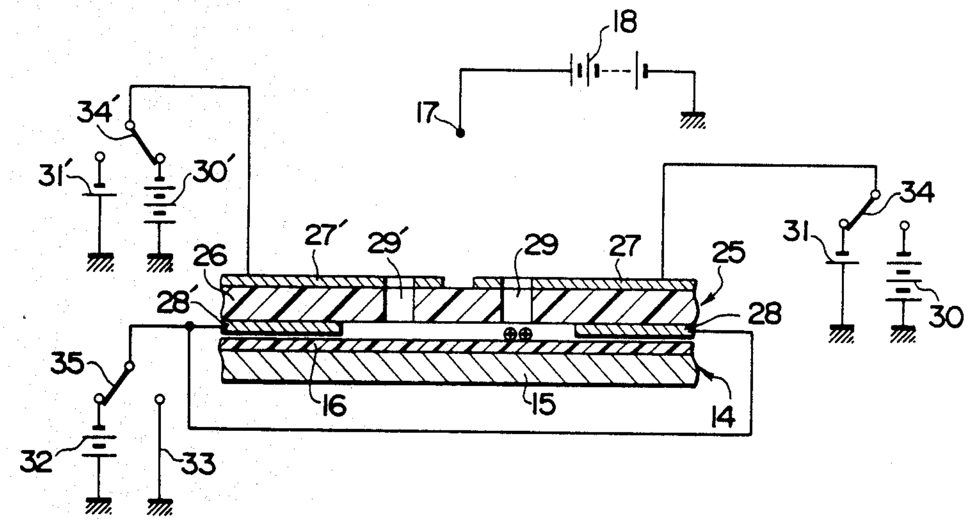
FIG. 2A is a schematic diagram of an ion flow record head according to the invention.
Figure 2B:
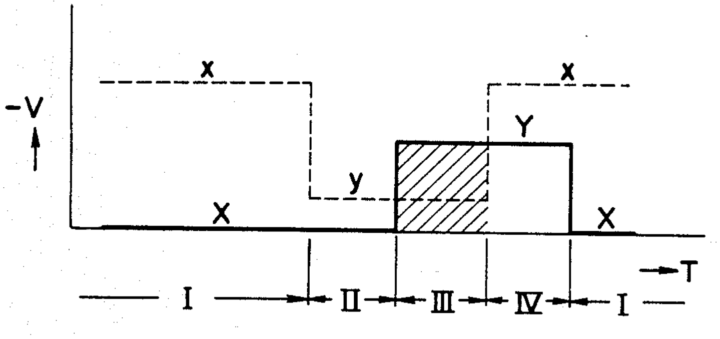
FIG. 2B graphically shows parameters which relate to the passage of an ion flow in the arrangement of FIG. 2A.
Figure 2C:
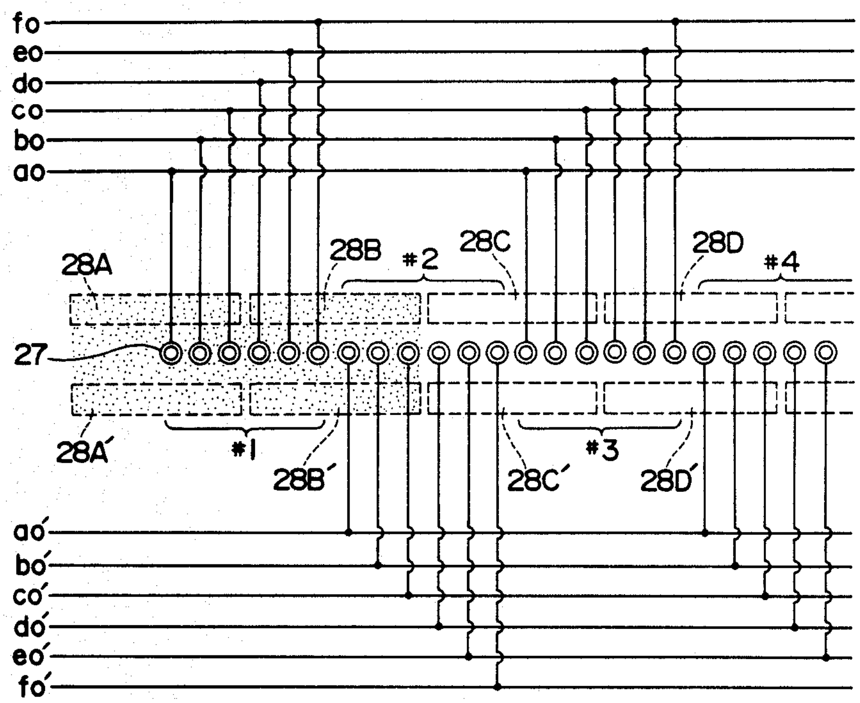
FIG. 2C is a diagram of a matrix drive circuit for the record head shown in FIG. 2A.

Referring to FIGS. 2A to 2C, there is shown an ion flow record head which is utilized to carry out an ion flow electrostatic recording process of the invention and which is specifically designed to enable a matrix drive, together with an illustration of the operation thereof and a wiring diagram of an electrode matrix. Referring to FIG. 2A, an electrostatic record paper 14 and a source 17 of corona ions are similar to those shown in FIG. 1A. A record head 25 comprises an insulating layer 26, on one surface of which are disposed a plurality of split electrodes 27, 27' to which a record signal is applied. A plurality of ion flow openings 29, 29' extend through the electrodes 27, 27' and the insulating layer 26. Block electrodes 28, 28' are disposed on the other surface of the insulating layer, and are electrically connected in common so that they assume an equal potential.

The record paper 14 is disposed so that a dielectric record layer 16 thereof is in contact with the block electrodes 28, 28'. It is to be noted that separate signal voltages are applied to the split electrodes 27, 27' and the block electrodes 28, 28'. While these signals are usually fed through a semiconductor switching circuit, they are illustrated in FIG. 2A by a combination of switches 34, 34', 35 and d.c. sources 30, 30', 31, 31', 32 and the ground potential 33.

The block electrodes 28, 28' are disposed so as to be slightly spaced from the ion flow openings 29, 29' in order to avoid a direct influence thereof upon the electric field which is created in the proximity of the openings. It is to be noted that the block electrodes 28, 28' have an area which is drastically greater than the area of the split electrodes 27, 27', and are capacitively coupled to the conductive support sheet 15 of the record paper 14. Accordingly, when a pulse voltage is applied to the block electrodes 28, 28' during the recording process, the conductive sheet 15 assumes the same potential as the block electrodes for a brief time interval, and such equipotential region extends to the conductive sheet which is located immediately below the ion flow openings 29, 29' which are interposed between the both block electrodes 28, 28'.

By contrast, when the block electrodes 28, 28' are connected to the ground potential or a potential close to the ground potential, a portion of the conductive sheet which is located opposite to these grounded block electrodes 28, 28' are fixed to the potential of the block electrodes and remains unchanged if remaining adjacent block electrodes are applied with a pulse to cause a corresponding increase in the potential of another portion of the conductive sheet which is located opposite to the latter block electrodes. In this manner, the potential of the conductive sheet can be locally controlled in a desired manner by means of the block electrodes 28, 28'.

FIG. 2B illustrates a condition which must be satisfied to allow the passage of the ion flow through the openings 29, 29' in a matrix drive arrangement. The ordinate indicates the magnitude of a voltage applied to each of the split electrodes 27, 27' and the block electrodes 28, 28', the scale being denoted by $-V$ to represent a negative voltage. The abscissa indicates a time passed T. The illustration is chosen to depict every combination of voltages by indicating signals applied to the split electrodes 27, 27' and the block electrodes 28, 28' at displaced points in time. In this illustration, dotted lines indicate the potential of the split electrode, and the higher the magnitude of the negative voltage, the greater the resistance to the passage of the corona ion flow. Accordingly, a region indicated by pontential x represents an off region while a region having a potential y represents an on region. When the block electrode has a negative potential of a high magnitude, the passage of the ion flow through the opening is assisted, and hence a region having a potential X shown in solid line represents an off region while a region having a potential Y represents an on region. In terms of an electric field which is defined by a combination of both electrodes, it will be seen that when the split electrode assumes a negative potential with respect to the block electrode, the movement of the ion flow into the opening is disabled, thus corresponding to an off condition. It will be noted that such condition is met in regions I, II and IV which correspond to combinations of potential x and potential X, pontential y and potential X, and potential x and potential Y. By contrast, when the split electrode assumes a positive potential with respect to the block electrode, the corona ion flow is free to pass through the opening, forming an electrostatic latent image. This corresponds to a combination of potential y and potential Y or region III where both signals establish an on condition. It will thus be seen that no recording operation takes place whenever an off signal is applied to either electrode, signifying that a record can only be made at a point of intersection in a matrix.

It is to be noted that in the record head 25 shown in FIG. 2A, an electric field developed by the source 17 of corona ions exists as an external field which has an influence upon the openings 29, 29'. Accordingly, it is necessary that for a half-select condition in which an on signal is applied to either one of the split electrode and the block electrode, the voltage applied to the split electrode be maintained at a level slightly negative with respect to the voltage applied to the block electrode 28 or 28'. Referring to FIG. 2B, the potential X is shown as a ground potential, but this is not essential. It will be seen that a half-select (off) condition is achieved by choosing a ground potential for the potential y and a low positive potential for the potential X.

As mentioned previously, combinations of potentials y and X and potentials x and Y represent a half-select condition, and the conditions for the matrix drive can be satisfied by choosing voltages applied to the split electrodes and the block electrodes such that the potential y is negative with respect to the potential X, the potential x is negative with respect to the potential Y and the potential Y is negative with respect to the potential y.

In accordance with the invention, a method of achieving a matrix drive comprises disposing a plurality of rows of ion flow openings and associated split electrodes, to which a record signal is applied, each row extending crosswise of a record paper, combining a plurality of openings and split electrodes into a group, connecting split electrodes, one from each non-adjacent electrode group, together to provide a signal terminal, disposing a plurality of block electrodes arranged such that one-half of each block electrode extends across the respective groups of split electrodes, and applying a half-select record signal voltage to one of the block electrodes which is disposed so as to extend across a selected one of the electrode group and to the signal terminal which is connected to the selected electrode group, thereby controlling the passage of a corona ion flow produced by a source of corona ions through a selected ion fow opening.

FIG. 2C is a diagram of a matrix arrangement for one row of openings of the record head as shown in FIG. 2A. In this Figure, a split electrode to which a record signal is applied is indicated by numeral 27. A plurality of electrodes disposed crosswise of a record paper are combined into a respective electrode group #1, #2, . . . . One split electrode from each alternate electrode group #1, #2, . . . are connected in common and connected to a signal terminal, as indicated by reference characters $a_0$, $b_0$, $c_0$, $d_0$, $e_0$, $f_0$, . . . ; $a'_0$, $b'_0$, $c'_0$, $d'_0$, $e'_0$, $f'_0$, . . . . Block electrodes 28A, 28A'; 28B, 28B'; . . . are disposed in a pair which are disposed on opposite sides of a row of openings associated with the split electrodes 27. These block electrodes are disposed so that their halves extend across a pair of adjacent groups of record electrodes 27, and each split block electrode is connected to a signal terminal.

In operation, during a recording operation, adjacent pairs of block electrodes 28A, 28A'; 28B, 28B' . . . are selected simultaneously, and an on signal is applied thereto while an off signal is applied to the remaining block electrodes. In the example shown, electrodes 28A, 28B, 28A', 28B' are selected. As a consequence, a region shown in black dots of the conductive sheet of the electrostatic record paper which correspond to these electrodes is capacitively coupled to the block electrodes 28A to 28B', assuming a potential which is close to the potential of these block electrodes. When a record signal is simultaneously applied to the signal terminals $a_0$ to $f_0$ at the same time as the selection of the block electrodes, a recording operation is performed by only the electrode group #1 which is surrounded by the selected block electrodes 28A to 28B'. The electrode groups #3, #5, . . . to which the record signal is simultaneously applied remain in their half-select condition, and therefore, no recording operation is performed by them. By selecting the block electrodes 28B, 28C, 28B', 28C' and applying a record signal to the signal terminals $a'_0$, $b'_0$, $c'_0$, $d'_0$, $e'_0$, $d'_0$, $e'_0$, and $f'_0$, a recording operation is performed by the electrode group #2.

Stated in general terms, for a matrix arrangement in which each electrode group includes n record electrodes and there are m pairs of block electrodes such as 28A, 28A'; 28B, 28B'; . . . , it will be seen that $n\times m$ record electrodes can be driven with $(2n+m)$ drive circuits.

It is to be understood that the block electrode shown in FIG. 2A is used not only in a matrix arrangement, but may be employed as an electrode to apply a given potential to the conductive sheet of an electrostatic record paper for a non-matrix arrangement.

As described, while the invention is directed to an electrostatic recording process of ion flow type, a recording operation is performed while disposing an electrostatic record paper in superimposed relationship with ion flow openings. This allows a given voltage to be applied to the conductive support sheet of the record paper through a capacitive coupling, by providing a block electrode having an increased area on that surface of an insulating layer having ion flow openings formed therein which is in contact with the record paper. The application of a record signal can be controlled merely through the record head, which is advantageous in constructing the recording apparatus. The block electrode may be divided into a plurality of sections, which are disposed in a manner corresponding to respective groups of record electrodes which are connected together in a matrix arrangement, thereby allowing a record signal to be applied in a matrix arrangement. This advantageously reduces the number of drive means required to control the application of a record signal.

It should be understood that the construction of electrodes used for a matrix drive arrangement is not limited to the particular example given above. By way of example, a given potential is maintained on the conductive sheet 15 of the electrostatic recording paper 14 in FIG. 1 by bringing a back electrode connected to a given potential, into contact with the conductive sheet 15. However, such back electrode may be divided in a manner similar to the electrodes 28, 28' shown in FIG. 2A so as to enable a matrix drive arrangement in the same manner as illustrated in FIGS. 2B and 2C.

In the example of the matrix arrangement shown in FIG. 2C, ion flow openings are disposed in a linear array. This may presents a difficulty where a high density of ion flow openings is desired inasmuch as a given insulating distance must be provided between annular record electrodes which in turn have a given size. Such, difficulty may be overcome by a two dimensional arrangement of ion flow openings.

Figure 3A:
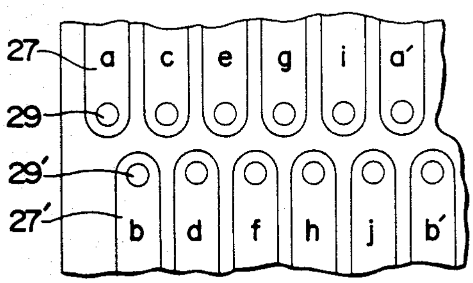
FIGS. 3A and 3B are enlarged, fragmentary plan views of record electrodes and ion flow openings laid out in a two dimensional array.
Figure 3B:
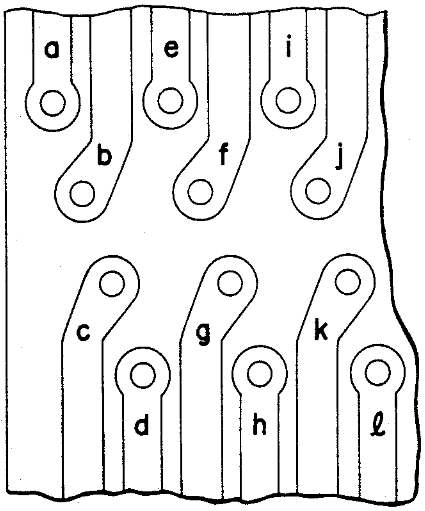

FIGS. 3A and 3B are plan views of proposed arrangements for two dimensional arrays of record electrodes and ion flow openings. In FIG. 3A, there are two rows extending perpendicular to the width of the record paper while there are four rows in FIG. 3B. Specifically, referring to FIG. 3A, record electrodes 27, 27' and ion flow openings 29, 29' are disposed in two rows. Each of elements a, b, c . . . j, a', b'. . . comprises an electrode and an ion flow opening. This facilitates a formation and an arrangement of the openings 29, 29' and the record electrodes 27, 27'. Obviously, the array of ion flow openings follow a zigzag pattern.

When a matrix drive is desired for a record head having two rows of record electrodes and openings, a given number of electrodes and openings in the two rows, which are ten in number covering from a to j in the example shown, are combined together into one group, and block electrodes are disposed so as to correspond to respective groups in the manner illustrated in FIG. 2C.

In FIG. 3B, there are four rows of electrodes and openings, each row extending in a direction perpendicular to the width of the record paper. As shown, electrodes and openings in one row are slightly offset from corresponding elements in an adjacent row so that a record signal is applied to an element as a single linear region being scanned passes through that element position in a two dimensional array during a movement of the record paper.

In a conventional ion flow recording process as illustrated in Japanese Patent Publication No. 43,317/1984, a control over the matrix drive of a two dimensional array of ion flow openings is achieved by disposing vertically and horizontally extending control electrodes on the opposite sides of an insulating layer so that a particular ion flow opening located at the point of intersection of selected electrodes is controlled. By contrast, in accordance with the invention, such approach of the prior art cannot be adopted because an electrode which surrounds an ion flow opening is located on one surface of the insulating layer. For this reason, according to the invention, a multitude of openings are disposed in rows extending crosswise of the record paper, and a plurality of such openings are combined into a separate group Record electrode associated with one ion flow opening from each non-adjacent group are connected in common and are connected to a signal terminal. A plurality of block electrodes are disposed so that their halves extend along the respective groups of ion flow openings, and half-select signal voltages are applied to the particular block electrode which is disposed so as to extend across a selected one of the opening groups and to a record electrode associated with a selected ion flow opening, thereby controlling the passage of the corona ion flow from the source through the selected ion flow opening. A matrix drive of such a record head takes place in the same manner as illustrated in FIG. 2C in that elements a, b, . . . l in a two dimensional array are combined into a single group which is located adjacent to another group and block electrodes are disposed so as to correspond to the respective groups.

Figure 4A:
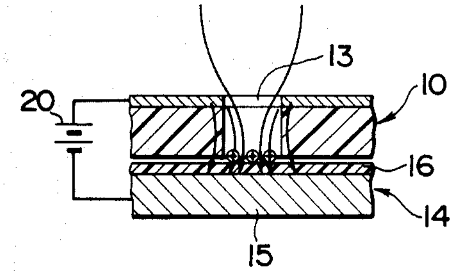
FIGS. 4A and 4B are fragmentary cross sections, to an enlarged scale, of a head which illustrates an automatic saturation and stabilization of the potential of a latent image according to the invention.

As described in some detail in connection with FIG. 1A, the ion flow electrostatic recording process of the invention has the function of automatically saturating and stabilizing the potential of a latent dot image which is formed on an electrostatic record paper, and such function will be described in more detail with reference to FIGS. 4A and 4B. FIG. 4A is a cross section of one element (electrode and opening) of a record head, schematically illustrating electric lines of force. A power source 20 for a record signal applies a voltage to create an electric field which attracts an ion flow into an ion flow opening 13. Electric lines of force are indicated by curved arrows. If the signal voltage is high, an ion flow from an area which is broader than the diameter of the opening will be collected to be driven into the opening 13.

Figure 4B:
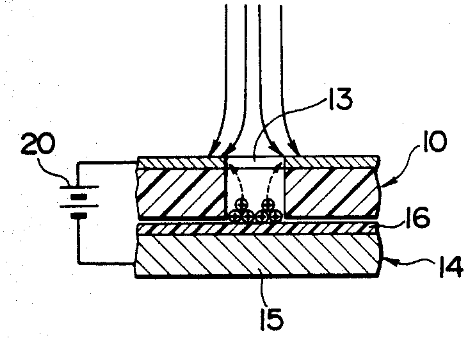

As the ion flow continues to pass while the signal voltage is maintained, the surface of the dielectric record layer 16 will be charged by corona ions as illustrated in FIG. 4B, and such charge is effective to weaken the electric field which is effective to draw the ion flow into the opening 13. When the corona ion flow is allowed to impinge upon the record layer for a sufficient time interval, the potential of a latent image formed on the record layer 16 will be balanced with the signal voltage, whereby the electric field which was previously effective to draw ions into the opening 13 is now completely nulled out, thereby reaching a stable condition. A change which occurs in the potential of the latent image during such time interval is substantially exponential, and is particularly high when the potential rises. Hence, by choosing a flow rate of corona ions such that the formation of a latent image is completed at the time a change in the potential of the latent image slows down, it is assured that an electrostatic latent image having a greatly stabilized potential is obtained, with the ability to control the potential freely by means of the magnitude of a voltage from the source 20.

Figure 5A:
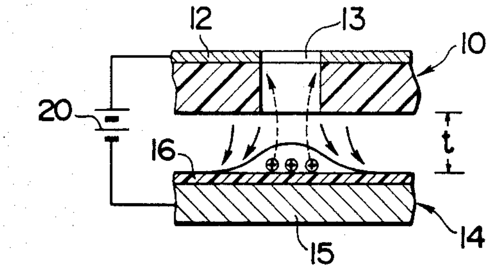
FIGS. 5A and 5B are fragmentary cross sections, to an enlarged scale, illustrating the influence of a gap between the record head and the record paper as a comparison between the head of the invention and a conventional head.
Figure 5B:
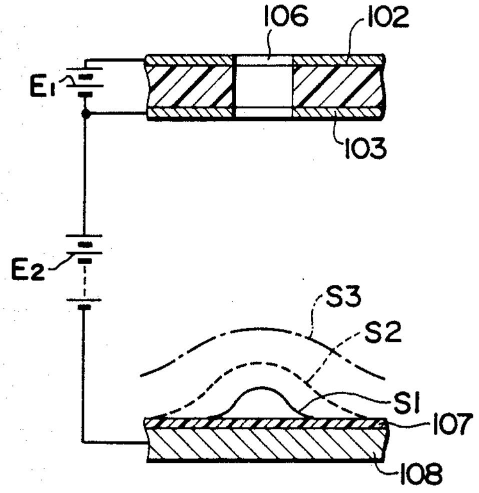
Figure 19:
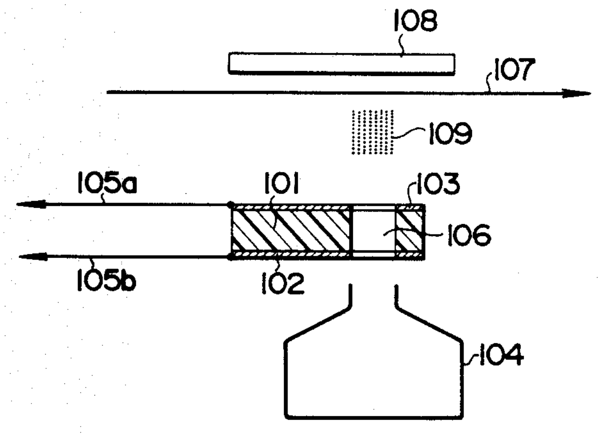
FIG. 19 (PRIOR ART)
FIG. 19 illustrates one form of conventional ion flow electrostatic recording apparatus.

It is to be noted that such automatic saturation and stabilization is strongly related to the gap between the ion flow opening 13 and the record paper 14, which is in turn strongly related to the effect of limiting the tendency to increase the diameter of a dot formed on the record paper. FIG. 5A is an illustration of the influence of such gap in the electrostatic recording process of the invention as contrasted to a conventional ion flow electrostatic recording process. FIG. 5B is an illustration of a change in the diameter of a dot recorded when the quantity of ions which form a recorded dot is increased in a conventional ion flow electrostatic recording process as illustrated in FIG. 19. In this Figure, $E_1$ represents a signal source which causes the passage of an ion flow, and $E_2$ a bias source which is used to create an electric field to direct the ion flow, which has passed through an opening 106, onto a record medium 107 placed on top of a back electrode 108 without allowing a dispersion of the ion flow. With the conventional recording process, the magnitude of the gap between the opening 106 and the record medium 107 is substantially greater than the diameter of the opening 106, whereby during the flight of the ion flow through the gap, the bias source $E_2$ which provides a high voltage is provided in order to create an electric field which prevents the ion flow from spreading apart.

FIG. 5B graphically shows a plurality of curves S1 to S3 which indicate a relationship between a change in the potential of the latent image and an increase in the dot diameter. A dispersion or a spreading of the charge is small when the potential of the latent image is low, as indicated by the curve S1. However, when the potential of the latent image is raised as indicated by curves S2 and S3, the diameter of the dot in the latent image increases considerably. Accordingly, it is necessary to maintain an accurate potential of the latent image in order to assure an image of a favorable quality, but it is not a simple matter to establish and maintain a given potential of the latent image.

By contrast, in the ion flow electrostatic recording process of the invention, where the opening 13 is held in close contact with the record paper 14, the charge which forms the latent image will be distributed in a range which does not go beyond the ion flow opening, as will be appreciated from the illustration of FIG. 4B. FIG. 5A illustrates the formation of a dot in the latent image which has a maximum diameter when a gap t between the opening 13 and the record paper 14 is substantially comparable to the diameter of the opening 13. As the potential of the latent image rises, an electric field is created which is effective to direct the ion flow to the marginal area of the dot to increase its diameter, such electric field being indicated by curved solid line arrows. At the same time, an electric field which is created between the record medium and the record electrode 12 as a result of the electric charge which forms the dot in the latent image functions to block the movement of the ion flow into the opening 13, as indicated by dotted, curved arrows, thus cancelling out the effect of the voltage applied from the source 20. In sum, the movement of the ion flow into the opening 13 will be blocked before the effect of increasing the dot diameter becomes so great, thus maintaining a constant potential of the latent image and preventing the dot diameter from increasing.

Such self-stabilizing effect will be rapidly lost if the gap t between the opening 13 and the record paper 14 increases. Therefore, it is desired that the gap t be maintained equal to or less than the diameter of the ion flow openings. More preferably, the gap t is maintained equal to or less than one-half the diameter of the ion flow opening. This requirement can be easily met in the electrostatic recording process of the invention, since the ion flow opening is disposed in superimposed relationship with the electrostatic record paper during the operation.

Maintaining a small gap t brings forth another advantage. Specifically, in the process of the invention, nothing other than the signal voltage is used to create an electric field which directs the ion flow, which has passed through the ion flow opening, onto the dielectric record layer, and accordingly, if the gap t increases, the effectiveness of such electric field will decrease, and any compensation therefor will require an increased magnitude of the signal voltage, thereby causing an increased loading upon the power supply and the signal circuit and causing a loss of margin in the voltage withstanding capability across the electrodes of the record head. All these disadvantages and difficulties can be avoided by maintaining a small gap.

Figure 6:
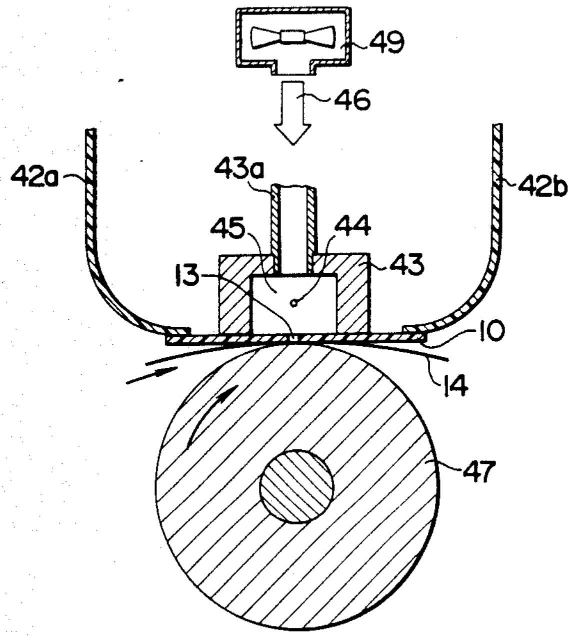
FIG. 6 is a fragmentary cross section of an ion flow electrostatic recording apparatus according to a first embodiment of the invention.

FIG. 6 is a schematic cross section of an ion flow recording apparatus according to a first embodiment of the invention. The apparatus includes an ion flow head 10 having ion flow openings 13 formed therein and an electrostatic record paper 14, both of which are constructed in entirely the same manner as mentioned previously. The record paper 14 is disposed in superimposed relationship with the lower surface of the head 10 by means of a roller 47 which has the combined function of support, conveyor and the back electrode. In this manner, the record paper is fed in a direction indicated by an arrow while it is maintained in abutment against the lower surface of the head.

The upper surface of the ion flow head 10 is covered by and supported by a support frame 43 which serves as a shielding casing of a Corotron, and the support frame 43 cooperates with the head 10 to define a hermetically sealed chamber 45. Pressurized air is introduced into the chamber 45 from a source of pressurized air 49 through a piping 43*a*, as indicated by an arrow 46. A corona wire 44 is disposed in the chamber while reference characters 42*a* and 42*b* represent portions of a circuit board for the driver of the ion flow head. It will be appreciated that these components may be separately mounted on the frame, but preferably selected ones or all of the components are constructed together as an integral assembly.

Figure 7:
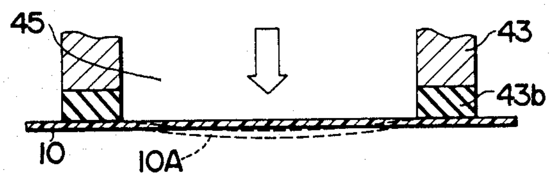
FIG. 7 is a fragmentary cross section, to an enlarged scale, of an ion flow head and a record paper.

FIG. 7 shows the detail of a structure which produces an abutting relationship between the ion flow head 10 and the record paper 14. Specifically, the head 10 comprises a plastic sheet such as may be formed of polyimide film having a thickness on the order of 50 to 200 microns, for example, to one surface of which is applied a metal foil such as nickel foil having a thickness on the order of 5 to 20 microns. Record electrodes and ion flow openings are formed as by an etching technique on and in this sheet. Because the sheet is very thin, it may be maintained in planar form by the support frame 43 to define the hermetically sealed chamber 45 together with the frame. When the pressurized air is introduced into the chamber 45, part of such air flows through the ion flow opening 13, but because the area of the opening 13 is small, the chamber 45 is maintained under pressure, whereby the ion flow head 10 is deformed or flexed toward the outside as indicated by dotted line 10A. In order to allow the flexure to be increased in a positive manner, an elastic member 43*b* such as may be formed of rubber is applied to the ends of the frame 43 to present a reduced resistance to a lateral displacement, thereby accommodating for any deformation occurring in the lateral direction as a result of the flexure of the head 10.

Figure 8:
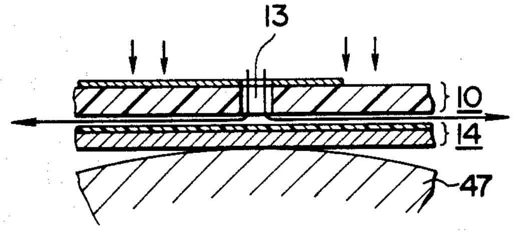
FIG. 8 is a fragmentary cross section, to an enlarged scale, illustrating the construction of an ion flow head and an electrostatic record paper.

Referring to FIG. 8, the record paper 14 is supported by the roller 47 which is rigid, so that the flexure of the head 10 allows it to be maintained in abutting relationship with the record paper 14. At the same time, the pressurized air partly passes through the ion flow opening 13 and then through a channel defined by a very small clearance formed between the head 10 and the record paper 14. In this manner, the air stream passing through the opening 13 flows along a boundary surface between the head 10 and the record paper 14. Such projection of the air stream is effective to prevent any foreign matter from being introduced into the space within the ion flow opening 13 as carried by the record paper 14. The air stream also produces a lubricating effect between the head 10 and the record paper 14, thus preventing the abrasion of the head 10. While the support frame 43 has been illustrated as having a combined function of supporting the head, defining the hermetically sealed chamber and a shielding electrode of a corona charger, it should be noted that what is required of the support frame 43 according to the invention is to provide a frame which defines a hermetically sealed chamber. Accordingly, the term "support frame" as used herein is intended to mean a member which defines a hermetically sealed chamber. In this sense, embodiments in which a shielding electrode of a corona charger is separate from the support frame or in which a support member for the ion flow head is provided separately are also considered to be within the scope of the present invention.

Figure 9:
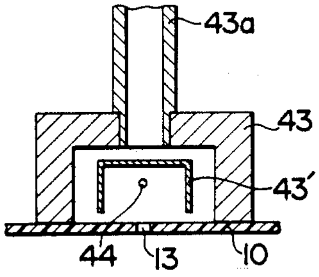
FIGS. 9 and 10 are fragmentary cross sections of several forms of a hermetically sealed chamber defined with respect to an ion flow opening.
Figure 10:
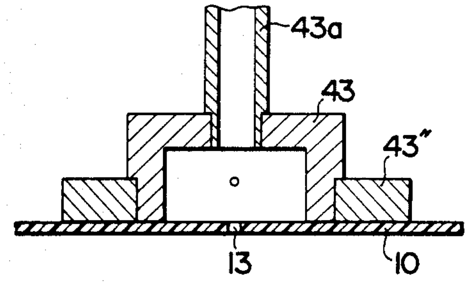

By way of example, FIG. 9 illustrates a shielding electrode 43′ of a corona charger which is separate from the support frame 43 defined by the hermetically sealed chamber and which is disposed inside the chamber. Similarly, FIG. 10 shows another example in which a support frame 43″ for the ion flow head 10 is separate from the support frame 43 of the invention which defines the hermetically sealed chamber.

Figure 11:
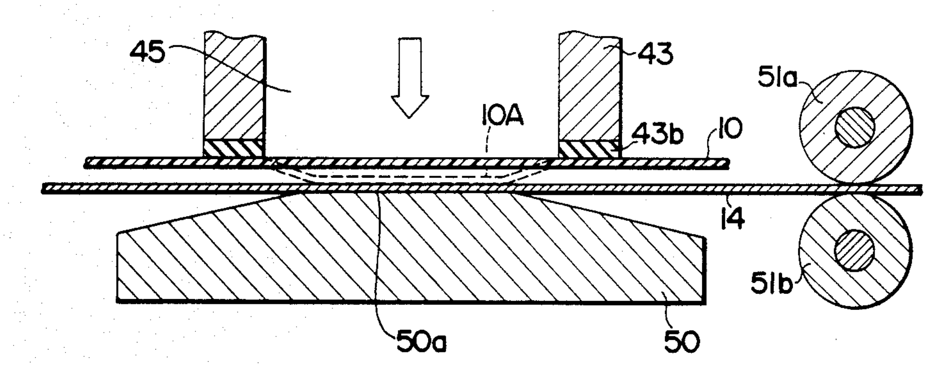
FIGS. 11 and 12 are fragmentary cross sections, to an enlarged scale, of several forms of support members for the electrostatic record paper.

In the embodiment described above, the rigid roller 47 serves the combined functions of supporting and conveying the electrostatic record paper 14. However, when the two dimensional array of ion flow openings 13 is extensive and the width of the array as viewed in the direction of travel of the record paper 14 increases, the ion flow head will be spaced from the roller at the end of the array, resulting in a failure to maintain a superimposed relationship between the head 10 and the record paper 14. In such instance, the support member for the record paper 14 may comprises a flat member rather than a roller. FIG. 11 shows such an example. Specifically, a support member 50 having a flat support surface 50*a* is substituted for the roller 47 and the record paper 14 is conveyed over the support surface 50*a* by a pair of feed rollers 51*a*, 51*b*. When the pressurized air is introduced into the chamber 45, the head 10 flexes as indicated by dotted lines 10A, whereby both the record paper 14 and the head 10 are urged against the flat support surface 50*a* of the support member 50. The pressurized air stream also passes through the ion flow opening 13, again preventing any movement of foreign matter into the opening 13 and providing a lubricating effect between the head 41 and the record paper 14.

Where the ion flow head 10 is supported by a rigid support frame or the rigidity of the head itself is strong enough to prevent its substantial deformation under the influence of the pressurized air, resiliency may be provided on the part of a support member for the record paper 14. For example, a rigid record head which maintains the planarity by itself may comprise a ceramic or glass substrate having a thickness on the order of 0.1 to 0.2 mm on which electrodes are formed as by photo-etching or laser machining. This improves the planarity over a flexible construction, and also enhances the abrasion resistance of the insulating material. In such instance, signal electrodes are integrally formed on one surface of an insulating sheet which is capable of maintaining planarity by itself and in which ion flow openings are formed. A source of corona ions is disposed in opposing relationship with the side of the head on which the record electrodes are disposed while a record paper is disposed in superimposed relationship with the other surface of the insulating sheet. A signal voltage is applied to the record electrode to control an electric field within the ion flow opening, thereby controlling the passage of corona ions through the opening. A hermetically sealed chamber is defined by the ion flow head and the support frame therefor, and an elastic member which urges the record paper against the head is disposed on the other side of the record paper so as to allow the record paper to run while maintaining it in abutment against the head. Pressurized air is introduced into the chamber to cause an air stream to pass the ion flow opening (not shown in FIG. 12) so as to flow along the boundary surface between the head and the record paper.

Figure 12:
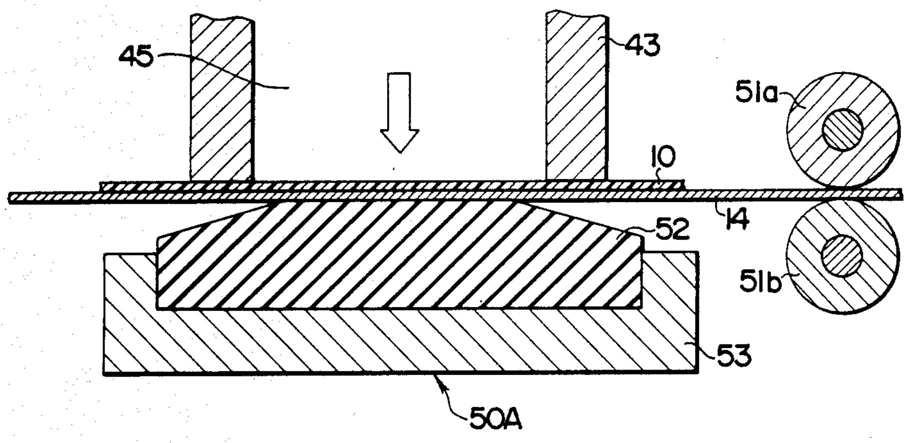

Such an arrangement is illustrated in FIG. 12, and differs from the arrangement of FIG. 11 in that a support member 50A comprises an elastic member 52 carried inside a frame 53. The elastic member 52 may comprise rubber of a low hardness, foamed rubber or plastics. The foamed rubber or foamed plastics material is preferred which lend themselves to deformation, provide an increased magnitude of deformation and provide a given pressure in a stable manner. Since the record paper 14 comprises a support paper which is subject to a treatment to make it conductive, it is not always necessary that the elastic member 52 and the frame 53 be conductive, but preferably the latter members are made conductive in order to prevent any fluctuation in the potential of the entire record paper during the recording operation.

Another advantage accrues from the arrangement of FIG. 12 in that the air pressure within the hermetically sealed chamber and the force with which the head is urged against the record paper can be established independently from each other, thus allowing a relatively free choice of the amount of air which is admitted through the ion flow opening. In addition, the construction of the ion flow head and the support frame is simplified and is subject to less limitation.

As mentioned previously the introduction of pressurized air into the hermetically sealed chamber to cause it to pass through the ion flow opening so as to flow along the interface between the ion flow head and the record paper is highly effective in preventing the deposition of any foreign matter which may be carried by the record paper into the ion flow opening. However, there results an opposite effect if dust is entrained in the pressurized air. To prevent this, when the combination of the ion flow head and the support frame therefor define the hermetically sealed chamber, in accordance with the invention, there are also provided means for urging the head against the record paper so that the record paper travels while maintaining its abutment against the head, means for introducing the pressurized air into the chamber and means for removing any dust from the pressurized air. In this manner, an air stream free from any dust is caused to pass through the ion flow opening to flow along the boundary surface between the head and the record paper.

Figure 13:
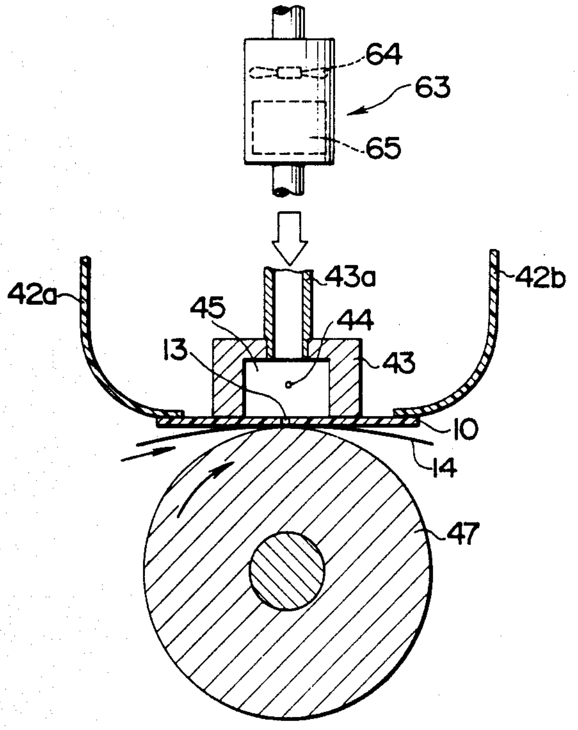
FIG. 13 is a fragmentary cross section of an ion flow electrostatic recording apparatus according to a second embodiment of the invention.

FIG. 13 shows a second embodiment of the invention, which essentially comprises the apparatus shown in FIG. 6, to which a dust removing device is attached. Specifically, an air ventilator 63 comprises a fan 64 and an anti-dust filter 65. While a high performance filter capable of removing down to very fine particles due to its reduced air flow rate may be employed for the filter 65, it may be replaced by or used in combination with a porous filter. Alternatively, an electrical precipitator which operates on a completely different principle may also be used. The resulting arrangement completely prevents a movement of any foreign matter into the ion flow opening which may cause a plugging thereof, thus improving the durability of the record head.

While a plugging of the ion flow opening caused by foreign matter can be sufficiently prevented with the described arrangement, it is also to be noted that superfine particles or vaporized components which cannot be removed by the dust removing device may deposit a film on the wall of the ion flow opening over a prolonged period of use. Such film does not block the opening, or presents no problems in a dry environment, but when placed in an environment of high humidity, such film exhibits a reduced resistance to cause difficulties. With a conventional ion flow head in which electrodes are placed above and below the opening in close contact therewith, the presence of such film and the high humidity cause a dielectric breakdown, thus damaging the head. However, with the ion flow head of the invention, no damage of the head will be caused even though the electric field created within the ion flow opening will change to cause a disturbance in the ion flow.

The described problem can be overcome according to the invention by defining a hermetically sealed chamber by the combination of the ion flow head and the support frame therefor. Means for urging the record paper into abutment against the ion flow head is provided so as to cause the record paper to travel while maintaining its abutment against the head. Means for introducing pressurized air into the chamber, means for removing any dust from the pressurized air, and means for lowering the relative humidity of the pressurized air are also provided, thus causing a dry air stream which is free from any dust to flow along the boundary surface between the head and the record paper after it has passed through the ion flow opening.

Figure 14:
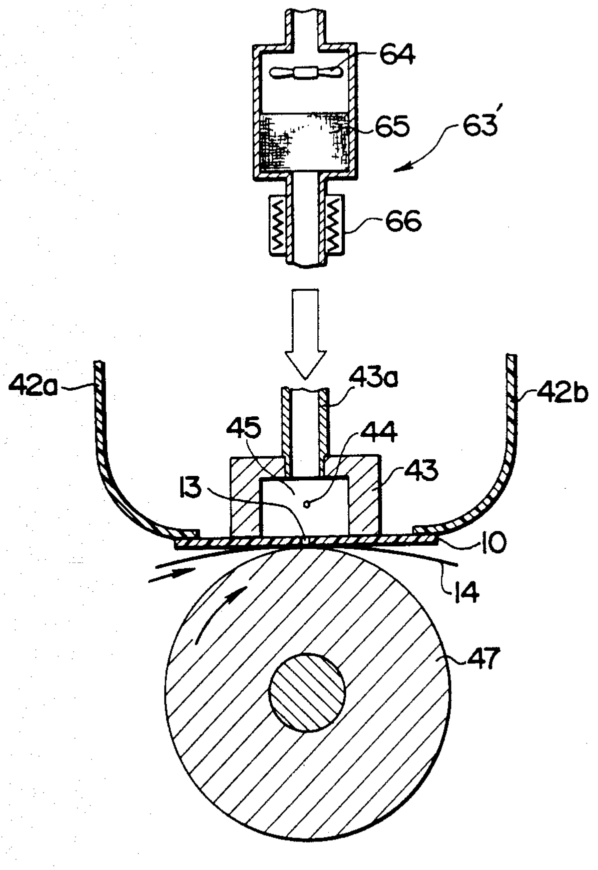
FIG. 14 is a fragmentary cross section of an ion flow electrostatic recording apparatus according to a third embodiment of the invention.

Such an arrangment is shown in FIG. 14 as a third embodiment of the invention. An air ventilator 63' comprises a fan 64 and an anti-dust filter 65, as described before, and additionally a heater 66 is associated with the ventilator for lowering the relative humidity of the air by raising the temperature of the pressurized air. When the relative humidity of the pressurized air stream is lowered, any deposition of film on the wall of the ion flow opening cannot cause a reduction in the electrical resistance and consequent disturbance in the ion flow since the dry condition is maintained. In the embodiment shown, the heater 66 is located in piping which feeds the pressurized air to the hermetically sealed chamber within the ion flow head, but it will be understood that the heater may be located anywhere in the path of the pressurized air which is directed to the ion flow opening. Alternatively, an electronic cooling element may be used to form dews in order to remove the humidity.

It should be understood that the use of the described arrangement is not limited to the ion flow recording apparatus of the present invention, but is also applicable to a variety of apparatus in which a recording operation takes place while maintaining an ion flow head in superimposed relationship with an electrostatic recording paper. Most conventional apparatus employ a record head and a record medium which ar spaced apart by a narrow gap and the record medium comprises a rigid drum. The gap has a length on the order of 0.2 to 1 mm, and in order to maintain an accurate gap, a spacer having a thickness corresponding to the gap length may be provided as an integral part of an ion flow head assembly, so that the assembly can be disposed in superimposed relationship with the record medium, thus greatly simplifying the relative positioning of the record medium and the record head. The invention is equally applicable to such apparatus also.

Figure 15:
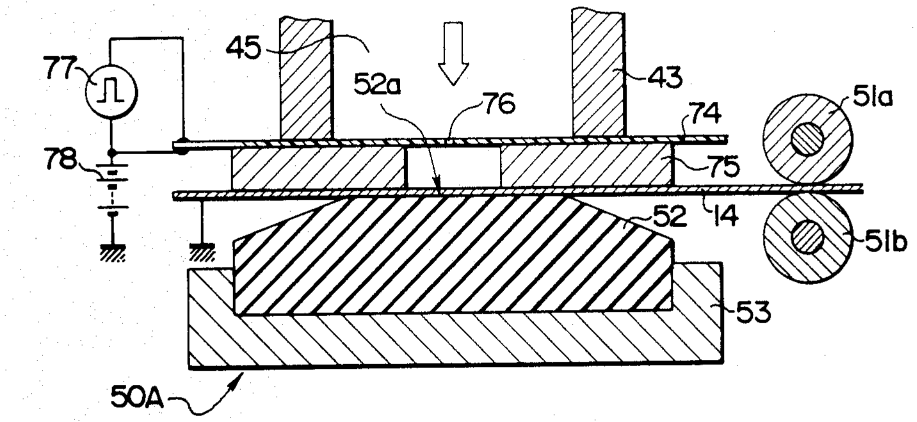
FIG. 15 is a fragmentary cross section, to an enlarged scale, of an ion flow electrostatic recording apparatus according to a fourth embodiment of the invention.

FIG. 15 shows a fourth embodiment of the invention, which is essentially similar to that shown in FIG. 12 except for an ion flow head 74 and sources of signal and bias voltages. The head 74 is conventional in that it comprises record electrodes integrally formed on the opposite surfaces of an insulating layer, in which ion flow openings 76 are formed. A record signal from a source 77 is applied across both electrodes of the head 74 to create an electric field within the opening 76 which accelerates or blocks the passage of an ion flow therethrough. In this embodiment, the head 74 is integrally provided with a spacer 75, which forms part thereof.

It is to be noted that the spacers 75 are sufficiently spaced from the edge of the opening 76 to avoid its interference with the ion flow opening 76 or the passage of ions. A voltage having a magnitude which depends on the thickness of the spacer 75 is applied from a bias source 78 across the electrode on the head 74 and a conductive support of the record paper 14 or the support member 52 for the record paper, thus preventing a dispersion of the ion flow after its passage through the opening 76. The support member 52 comprises an elastic material and includes a flat support surface 52a which is effective to urge the record paper 14 against the lower surface of the spacer 75, thus maintaining an accurate and stabilized gap between the opening 76 and the record paper.

The head 74 cooperates with a support frame 43 to define a hermetically sealed chamber 45, into which pressurized air is introduced. Accordingly, there is an air stream which constantly flows through the opening 76 to prevent the latter from being plugged with foreign matter. Such air forms an air stream between the spacer 75 and the record paper 14 to provide a lubricating function to prevent the abrasion of the spacer 75 during the movement of the record paper 14. In a region adjacent to the ion flow opening where the spacers 75 are spaced apart, the record paper 14 tends to be flexed toward the opening 76. The pressurized air stream which passes through the opening 76 increases the pressure which prevails in the space left between the spacers 75, thereby counteracting the pressure of the record sheet.

Figure 16:
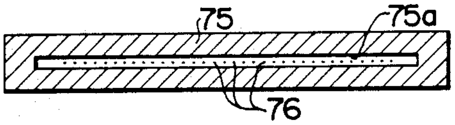
FIG. 16 is a cross section illustrating the configuration of an opening in a spacer shown in FIG. 15.

The lubricating action between the spacer 75 and the record paper 14 as well as the counteracting correction of a flexure in the record paper can be positively utilized by utilizing an arrangement illustrated in FIG. 16 in which a spacer opening 75a is entirely surrounded by the spacer 75 so that when the spacer opening 75a is covered by the record paper 14, a completely enclosed space is formed by the record paper.

Figure 17:
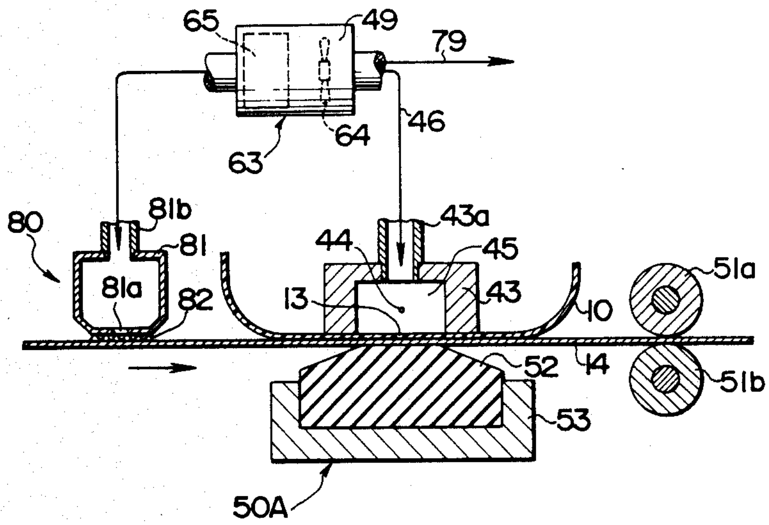
FIG. 17 is a cross section of one form of suction cleaner which may be employed in the arrangement of the invention.

FIG. 17 shows a fifth embodiment of the invention. As discussed above, the invention prevents a plugging of the ion flow opening, simplifies and stabilizes a mechanism which positions the head and the record paper relative to each other, and increases the lubricating function between the sliding surfaces of the head and the record paper to prevent the abrasion of the head. The prevention of a plugging of the ion flow opening can be more effectively achieved by a certain addition. Specifically, a suction cleaner may be provided upstream of the ion flow head, as viewed in a direction in which the record paper travels, thus removing any dust from the record paper before it is fed into cooperation with the head.

Such an arrangement is shown in FIG. 17 as a fifth embodiment of the invention. It is to be understood that the construction of the ion flow head and the mechanism to support and feed the record paper remains the same as described in connection with FIGS. 6 to 16, and therefore will not be specifically described. In the embodiment shown in FIG. 17, as the record paper 14 travels in the direction indicated by an arrow, a suction cleaner is disposed upstream of the head 10 to remove any dust from the record paper 14 before it reaches the head. The suction cleaner includes a cleaner head 80 comprising a housing 81 which defines an enclosed chamber, a suction opening 81a, a suction piping 81b and a contact tip 82. The suction piping 81b is connected to a source of negative pressure. In order to produce a high speed air stream to remove any dust from the surface of the record paper, the contact tip 82 which is disposed for contact with the record paper is machined so as to produce a high speed air stream, as by forming a number of shallow grooves therein or adhesively applying a mesh-like member or implanted hairs thereon. It will be noted that the cleaner head 80 is connected to the air intake port of a source 49 which supplies pressurized air to the hermetically sealed chamber 45, through the piping 81b.

It will be noted that a fan or an air pump is used to supply a stream of pressurized air into the chamber 45, and hence the connection of the cleaner head 80 to the air intake port of such pump allows a common use of such fan or air pump. To this end, an air ventilator 63 comprises an assembly of a fan 64 and an anti-dust filter 65. The filter 65 removes any dust from the surface of the record paper or from the air which may have been withdrawn by the cleaner head 80, thus cleaning the air which is fed into the chamber 45.

It is to be noted that the cleaner head 80 requires an increased flow rate of air while the ion flow head does not require an increased quantity of air stream. For this reason, part of the air which is withdrawn through the cleaner head 80 is discharged into the atmosphere to provide a balance therebetween. Hence an air channel 79 is disposed separately from an air channel 46 which directs the air to the chamber 45, for discharging a proportion of air into the atmosphere. Optionally, a heater may be provided as air drying means, thus supplying a dry air stream into the chamber 45 to prevent any malfunctioning of certain members located adjacent to the ion flow opening.

It should be understood that the described embodiments can be modified in various manners. For example, while the support frame 43 functions as a support for the ion flow head 10 and as the shield electrode for a Corotron, Corotron said may be separate from the support frame 43. Alternatively, the Corotron may be replaced by a combination of an insulated wire and an associated conductive member, across which a high voltage of a high frequency is applied to produce an a.c. corona, and a bias field may be applied to direct corona ions of a given polarity in a given direction. A source of ions is disclosed in a number of prior art patents, including U.S. Pat. Nos. 4,057,723, 4,068,284, 4,110,614 and 4,379,969.

Figure 18:
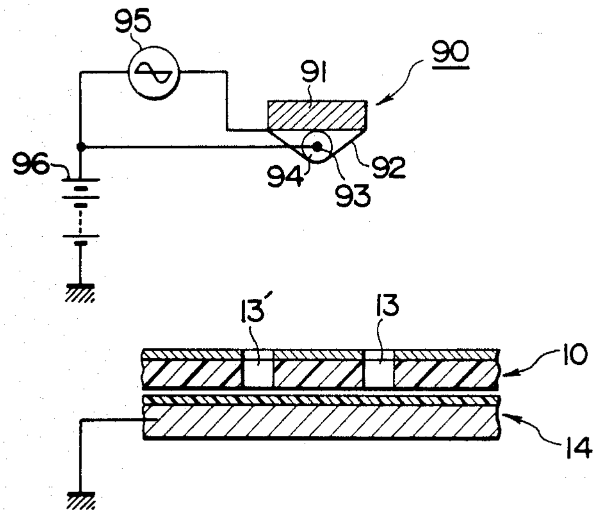
FIG. 18 is a fragmentary cross section, to an enlarged scale, of an ion flow electrostatic recording apparatus according to a fifth embodiment of the invention.

To illustrate further modifications of the invention, FIG. 18 shows a modified source of corona ions which enables a high speed recording operation. In this Figure, the modification relates to only a source of corona ions 90. The source 90 is designed to produce corona ions in a high density and in a stable manner by maintaining a dimensional stability. Specifically, the source 90 comprises a support block 91, a wire mesh 92, a corona wire 93, an insulating coating layer 94 formed around the corona wire 93, an a.c. source of high voltage 95 connected across the corona wire 93 and the wire mesh 92, and a d.c. source of high voltage connected to the corona wire 93.

In operation, when a high voltage of a high frequency from the source 95 is applied across the corona wire 93 and the wire mesh 92, a.c. corona ions are produced by the wire mesh 92. The bias source 96 creates an electric field which functions to direct corona ions of a given polarity, which is positive corona ions in the example shown, in a direction toward the record head 10. Since the components of the source 90 are supported on the support block 91 in a rigid manner and with a high precision, it may be disposed close to the record head 10 with a high accuracy, enabling the corona ion flow to act upon the record head 10 before a dispersion of the ion flow occurs. The insulating coating layer 94 applied around the corona wire 93 supports the wire mesh 92 in an exact and stable manner, thus enabling the generation of a stable ion flow.

Having described and shown several embodiments of the invention, it should be understood that a number of changes, modifications and substitutions therein will readily occur to one skilled in the art without departing from the scope and spirit of the invention defined by the appended claims.

What is claimed is:

1. An ion flow electrostatic recording process comprising the steps of: disposing a plurality of split record electrodes on one surface of an insulating layer, a record signal being applied to a selected record electrode, forming openings so as to extent through the record electrodes and the insulating layer in a manner such that the record electrodes each surround the periphery of an associated one of the openings to thereby form an ion flow record head, disposing a source of corona ions on one side of the record head on which the record electrodes are located, disposing an electrostatic record paper in superimposed relationship with the other surface of the insulating layer, the record paper comprising a dielectric record layer on a conductive support layer, the dielectric record layer engaging the exposed insulating surface of said insulating layer, applying a record signal across a selected record electrode and the conductive support layer, thereby controlling the passage of a flow of corona ions developed by the source through an ion flow opening.

2. An ion flow electrostatic recording process according to claim 1, further including the steps of disposing block electrodes on the other surface of the insulating layer at a location slightly spaced from the edge of the ion flow openings, disposing the record paper so that the dielectric record layer faces the block electrodes, and applying a record signal across the block electrode and the selected record electrode to create an electric field within the ion flow opening which controls the passage of the corona ion flow from the source through the ion flow opening.

3. An ion flow electrostatic recording process according to claim 1, further including the steps of disposing ion flow openings in a plurality of rows each extending crosswise of the record paper, combining a plurality of ion flow openings and associated record electrodes into an electrode group, connecting one record electrode from each non-adjacent group in common and connecting them to a signal terminal, disposing a plurality of block electrodes each having its one-half extending along adjacent electrode group, applying a half-select record signal across one of the block electrodes which extends across a selected one of the electrode groups and the signal terminal associated with the selected electrode group, thereby controlling the passage of a corona ion flow from the source through a selected ion flow opening.

4. An ion flow electrostatic recording process according to claim 1, further including the steps of disposing ion flow openings in a two dimensional array including rows which extend crosswise of the record paper, combining certain ion flow openings into a group, connecting record electrodes associated with one ion flow opening from each non-adjacent group in common and connecting them to a signal terminal, disposing a plurality of block electrodes each having its one-half extending along respective groups of ion flow openings, and applying a half-select record signal to one of the block electrodes which extends across a selected group of ion flow openings and to the record electrode associated with a selected ion flow opening, thereby controlling the passage of an ion flow from the source through a selected ion flow opening.

5. An ion flow electrostatic recording apparatus comprising:

an ion flow head including an insulating sheet, one surface of which is integrally formed with record electrodes, to which a record signal is applied, and through which ion flow openings extend;

a source of corona ions disposed on one side of the head on which the record electrodes are disposed;

a sheet-like record medium including a dielectric record layer which is disposed in superimposed relationship with the other surface of the insulating sheet, which other surface is an insulating surface, for electrostatically recording a corona ion flow which passes through an ion flow opening as controlled by a record signal applied to the record electrode;

a hermetically sealed chamber defined by the ion flow head and a support frame therefor;

means for urging the record medium against the ion flow head;

and means for introducing pressurized air into the hermetically sealed chamber to cause an air stream to pass through the ion flow opening and along a boundary surface between the head and the record medium, thus preventing a plugging of the ion flow opening.

6. An ion flow electrostatic recording apparatus according to claim 5 in which the ion flow head comprises a plastic sheet such as polyimide having a thickness on the order of 50 to 200 microns, one surface of which is adhesively applied with a metal foil such as nickel foil having a thickness on the order of 5 to 20 microns, the plastic sheet being formed with the record electrodes and the ion flow openings, and in which an elastic member such as may be formed of rubber is applied to the ends of the support frame to allow a flexure in the outward direction and a resulting lateral deformation of the ion flow head.

7. An ion flow electrostatic recording apparatus according to claim 5 in which the urging means comprises a support member for the record medium which is formed by a elastic member.

8. An ion flow electrostatic recording apparatus according to claim 5 in which the support frame for the ion flow head also serves as a shielding electrode of the source of corona ions.

9. An ion flow electrostatic recording apparatus according to claim 5 in which the support frame is separate from a shielding electrode of the source of corona ions.

10. An ion flow electrostatic recording apparatus according to claim 5 in which said means for preventing a plugging of the ion flow opening comprises means for removing any dust from the pressurized air and means for lowering the relative humidity of the pressurized air.

11. An ion flow electrostatic recording apparatus according to claim 5 in which said means for preventing a plugging of the ion flow opening comprises an air suction cleaner disposed upstream of the ion flow head as viewed in a direction in which the record medium moves.

12. An ion flow electrostatic recording apparatus according to claim 5 in which the source of corona ions comprises a corona wire, an insulating coating layer formed around the corona wire, a wire mesh disposed in contact with the insulating coating layer on the corona wire, a support block for supporting the corona wire and the wire mesh, a high voltage a.c. source connected across the corona wire and the wire mesh, and a high voltage d.c. source connected to the corona wire.

13. An ion flow electrostatic recording apparatus comprising:

a head for controlling ion flow including an insulating layer having first and second major surfaces;

a plurality of ion flow openings extending through said insulating layer and communicating with said first and second major surfaces;

a plurality of conductive electrodes arranged on one major surface of said insulating layer, each being electrically insulated from one another and each substantially surrounding an associated one of said ion flow openings;

means for directing a flow of ions toward said ion flow head and being arranged on the major surface of said ion flow head containing said electrodes;

a record medium having a dielectric layer arranged adjacent to the major surface of said insulating layer opposite the surface containing said electrodes;

the opposite major surface of said insulating layer being exposed to said record medium;

means for moving said record medium relative to said control head;

means for preventing abrasion between the adjacent surfaces of said ion record head and said record sheet when said record sheet is moving relative to said control head.

14. Recording apparatus comprising:

a record head having an insulating layer with first and second major surfaces and openings communicating with said first and second major surfaces;

a plurality of conductive members on one of said major surfaces, each surrounding one of said openings;

means for directing an ion flow towards the major surface of said insulating layer containing said conductive members;

a record sheet positioned adjacent to the remaining one of said major surfaces for receiving said ion flow;

the remaining one of said major surfaces being exposed to said record sheet, and means for maintaining said openings free of foreign matter.

15. The recording apparatus of claim 14, wherein said maintaining means includes means for providing an air flow between said record head and said record sheet to prevent abrasion between said record sheet and said record head.

16. The recording apparatus of claim 14 further comprising means for urging said record sheet toward said record head to maintain said record head openings and said record medium in superimposed relationship.

17. The recording apparatus of claim 14, wherein the distance between the record medium and the record head is no greater than the diameter of said openings.

18. The recording apparatus of claim 14, wherein said insulating layer is flexible.

19. The recording apparatus of claim 14, further comprising means including block electrodes arranged on the major surface of said insulating member adjacent to said record sheet for establishing an electrical potential at the adjacent surface of the record sheet due to the capacitive coupling therebetween.

20. The recording apparatus of claim 14, wherein the source of ions is hermetically sealed within housing means which includes said ion head.

21. The recording apparatus of claim 20 further comprising resilient means for resiliently coupling said ion head to said housing.

22. The recording apparatus of claim 14, further comprising support means for resiliently supporting said record sheet.

23. The recording apparatus of claim 14, further comprising resilient means for resiliently supporting said ion head to permit flexing of said insulating layer.

24. The recording apparatus of claim 20 further comprising means for preventing the accumulation of moisture in said housing.

25. The recording apparatus of claim 20 further comprising means for introducing air under pressure into said housing whereby the air is passed outwardly through said ion head openings.

26. The recording apparatus of claim 25, further comprising means for removing dust and other particulate from the air flow introduced into said housing.

27. The recording apparatus of claim 25, further comprising means for removing moisture from the air flow introduced into said housing.

28. The recording apparatus of claim 27, wherein said moisture removing means comprises a heater.

* * * * *

UNITED STATES PATENT AND TRADEMARK OFFICE
CERTIFICATE OF CORRECTION

PATENT NO. : 4,799,070

DATED : January 17, 1989

INVENTOR(S) : Masaji Nishikawa

It is certified that error appears in the above-identified patent and that said Letters Patent is hereby corrected as shown below:

Column 2, line 64, "image" should be --impinge--.

Column 9, line 17, delete "the".

Column 9, line 46, "pontential" should be --potential--.

Column 9, line 61, "pontential" should be --potential--.

Column 10, line 43, "fow" should be --flow--.

Column 11, line 61, "presents" should be --present--.

Column 12, line 42, after "group" insert --.--.

Column 12, line 43, "electrode" should be --electrodes--.

UNITED STATES PATENT AND TRADEMARK OFFICE
CERTIFICATE OF CORRECTION

PATENT NO. : 4,799,070

DATED : January 17, 1989

INVENTOR(S) : Masaji Nishikawa

It is certified that error appears in the above-identified patent and that said Letters Patent is hereby corrected as shown below:

Column 16, line 17, "comprises" should be --comprise--.

Column 18, line 47, "ar" should be --are--.

Column 20, line 40, "Corotron said" should be --said Corotron--.

Column 21, line 22, "extent" should be --extend--.

Column 22, line 55, "a" should be --an--.

Signed and Sealed this

Fifth Day of June, 1990

*Attest:*

HARRY F. MANBECK, JR.

*Attesting Officer* *Commissioner of Patents and Trademarks*